J. T. HALSEY.
CAR TRUCK.
APPLICATION FILED FEB. 8, 1911.
1,091,431.
Patented Mar. 24, 1914.
3 SHEETS—SHEET 1.
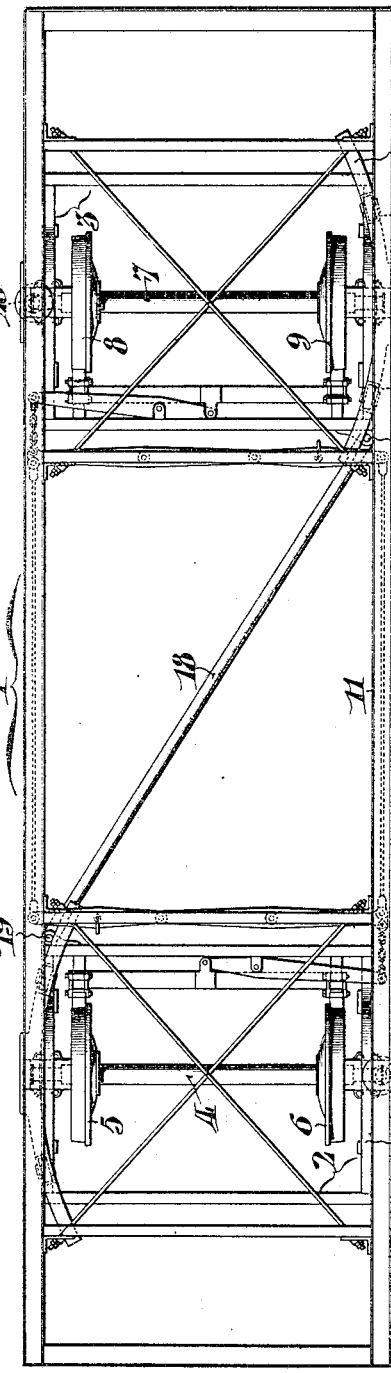
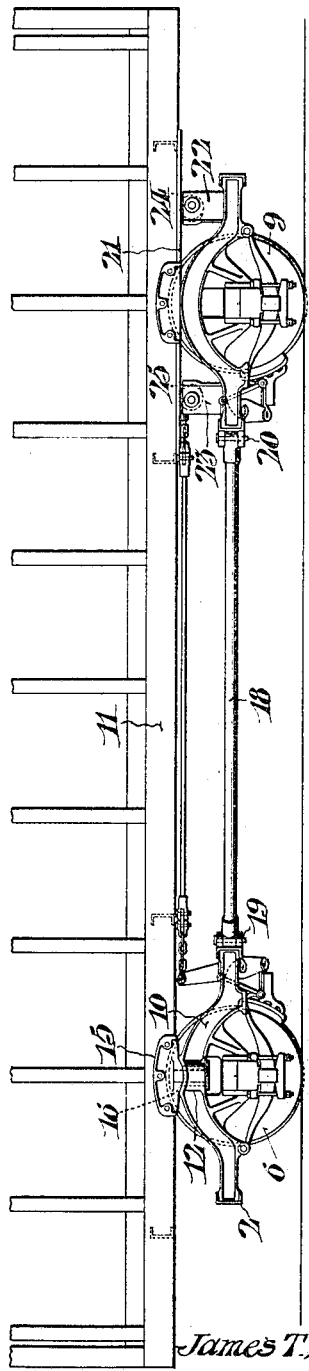
Witnesses
John C. Berquist
James L. Bell
Inventor
James T. Halsey,
By Raley & Paul
Attorneys

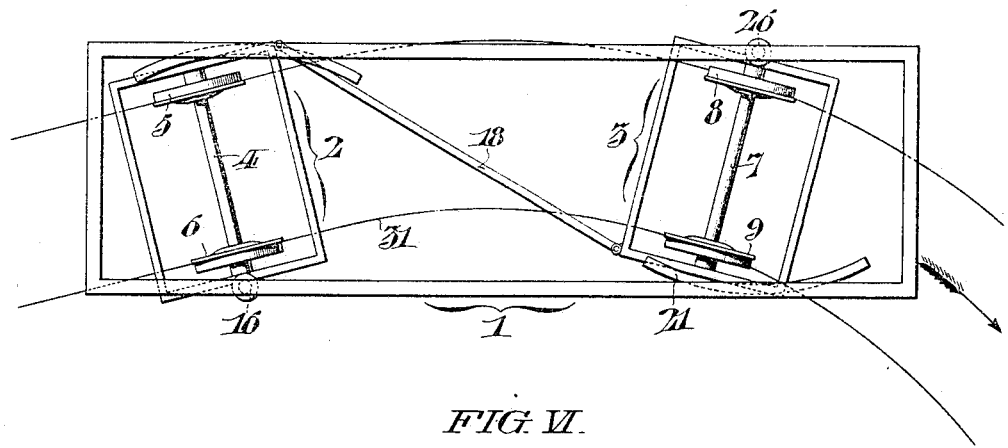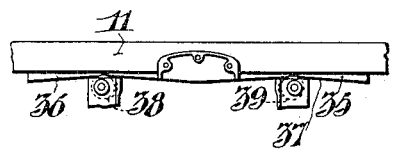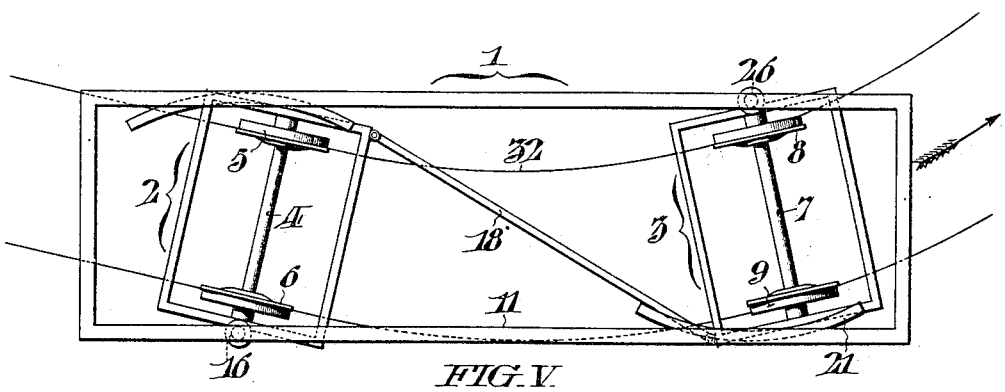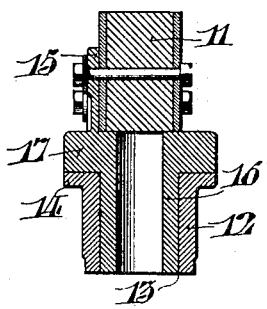

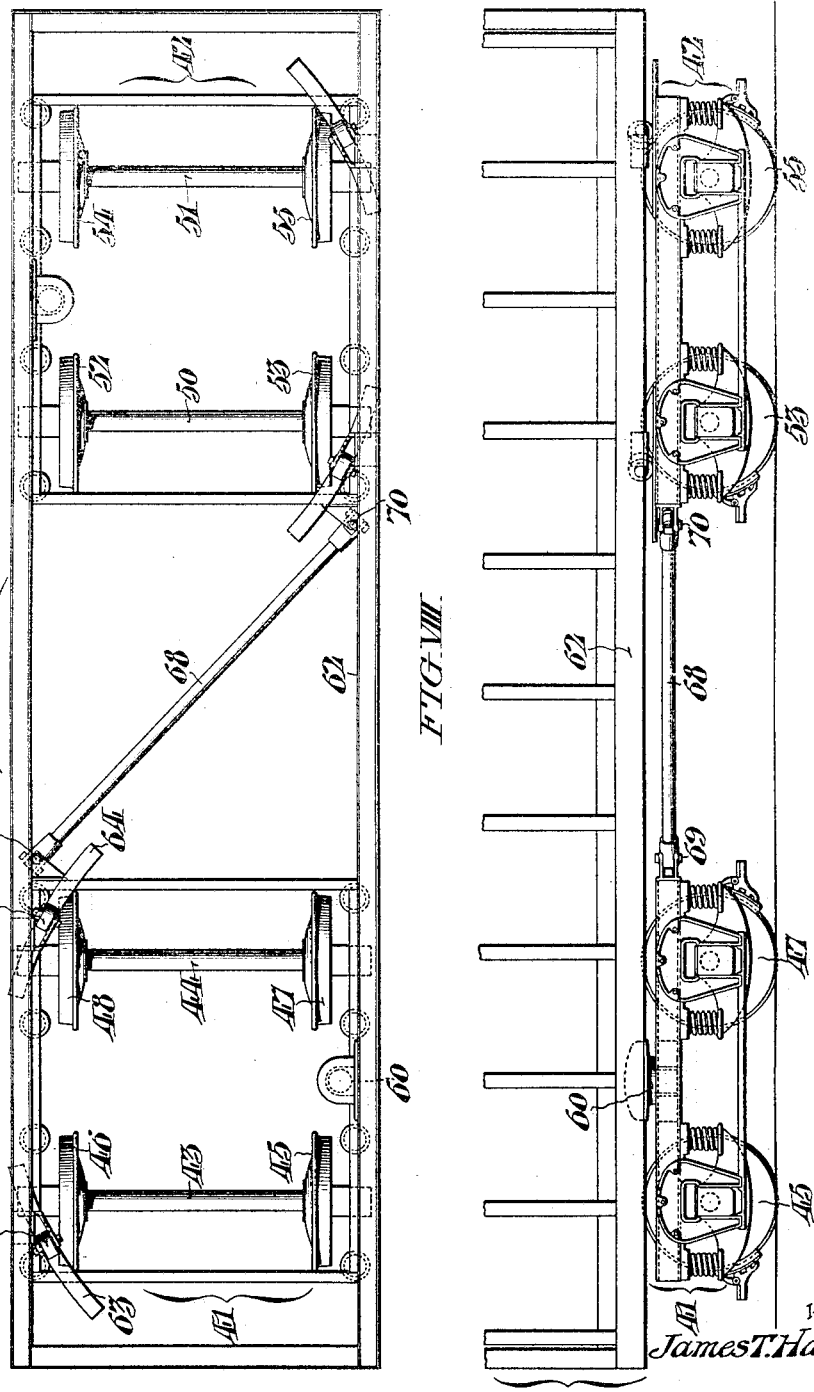

UNITED STATES PATENT OFFICE.

JAMES T. HALSEY, OF PHILADELPHIA, PENNSYLVANIA, ASSIGNOR TO PHILADELPHIA HOLDING COMPANY, OF PHILADELPHIA, PENNSYLVANIA, A CORPORATION OF DELAWARE.

CAR-TRUCK.

1,091,431.   Specification of Letters Patent.   Patented Mar. 24, 1914.

Application filed February 8, 1911.   Serial No. 607,290.

*To all whom it may concern:*

Be it known that I, JAMES T. HALSEY, of Philadelphia, in the county of Philadelphia and State of Pennsylvania, have invented certain new and useful Improvements in Car-Trucks, whereof the following is a specification, reference being had to the accompanying drawings.

I use the term "car" as comprehending broadly any wheeled vehicle which is adapted to run upon a railed track. I also use the term "truck" as comprehending broadly any structure adapted to support the body of a car with relation to the axle of the car wheels, irrespective of the particular character or details of such supporting structure.

In the accompanying drawings, Figure I, is a top or plan view, showing the skeleton of the under-frame of a four-wheel car provided with a pair of trucks embodying my invention. Fig. II, is a partial side elevation thereof, showing portions of the uprights of the car body. Figs. III, and IV, are diagrammatic views illustrating the behavior of the trucks and car body in passing along right and left hand curves, respectively. Fig. V, is a detail view, showing, in vertical section, a preferred form of the pivotal supporting connection which intervenes between the car and the truck. Fig. VI, is a detail view showing a modification of the traveling support which intervenes between the car and the truck. Fig. VII, is a top or plan view of a modified form of my improvements as applied to an eight-wheel car, having a pair of trucks embodying my invention, and Fig. VIII, is a partial side elevation of the structure shown in Fig. VII.

The main object of my invention is to facilitate the travel of a car upon curved portions of a track, by permitting and insuring such movement of the wheels and their respective axles with relation to the car body, as will tend to minimize undesirable resistance between the wheel flanges and the rails.

Among the important practical results are the following: The lateral pressure and the consequent wear of the wheel flanges against the rails are minimized, thus prolonging the life of the wheel; the consumption of power is lessened; the tendency to derailment is diminished; and an increased length of wheel-base of certain types of cars is permitted.

As is well known, the maximum wheel base which is practically permissible in four-wheel cars of the ordinary type, is determined by reference to the curve of shortest radius in the track, upon which the car is normally intended to travel, and the limitations imposed by this relation are attended with serious economic disadvantages both in the construction and operation of such cars. By the use of my improvements, the wheel base of a four-wheeled car may be lengthened to practically any limit which is desirable, without relation to the nature of the curves of the track upon which the car is intended to travel.

I will now proceed to describe an embodiment of my invention in a preferred form, which, however, is susceptible of various modifications, without departing from the spirit of the invention.

Referring to Figs. I, and II, 1, indicates conventionally the under frame of the car body, and 2, 3, the car trucks, each of which, in this instance, is provided with a single axle and pair of wheels. The axle of the truck 2, is indicated at 4, and the wheels thereof at 5, and 6, the truck 3, having an axle 7, and wheels 8, and 9. It is deemed unnecessary to describe the journal boxes, springs, brake mechanism or other adjuncts, since these features may be of any of the ordinary types in use, and are not directly related to my invention. Furthermore, since the two trucks and the elements comprised therein which embody my invention, are substantially duplicates of one another, (except for the reversal of position of certain parts with relation to the median plane of the structure), it will not be necessary to describe in detail all of the similar elements in both, the difference in location of the corresponding parts being, however, pointed out.

Referring to the left hand end of Figs. I, and II, the truck 2, is provided, upon the side which is nearest to the observer, with a hollow bearing 12, having a vertical cylindrical opening 13, surrounded by an outwardly projecting annular flange 14 (see Fig. V), which parts may be cast integrally with the arched side-piece 10, of the truck. Said bearing is adapted to freely receive a vertical supporting pivot 16, having an annular flange 17, which bears upon the flange 14. The side beam 11, of the under frame 1, rests upon the flange 17, and the latter, with its pivot, is rigidly attached to said beam 11, by means of the upwardly extending face plate 15, bolted to the side thereof. The axis of the pivotal supporting connection thus constituted should preferably intersect the axis of the axle 4, but is located at a substantial distance, laterally, from the longitudinal center of said axle. In the instance shown, the pivot is arranged above one extremity of said axle and beyond the outer face of the car wheel upon that side, a position which develops in a very high degree the advantages of my invention, but the location of the pivotal point, as will be hereafter explained, is not necessarily thus limited. This pivotal connection supports the car-body at one side, and permits the car-body and truck to swing with relation to one another, around a fixed axis located at a distance from the median plane of the car wheels. At the side of the truck opposite to this pivotal connection I provide a traveling support, which intervenes between the car body and the truck, and which is adapted to sustain the car body at that side, while permitting swinging movement of the truck and axle, with relation to the car body, about the axis of said pivotal connection. The details of this traveling support can most readily be seen by reference to the truck 3, which is at the right hand end of Figs. I, and II, where it will be noted that two uprights 22, and 23, are rigidly mounted upon the side of the truck, which is nearest to the observer, said uprights carrying friction rollers 24, and 25, respectively, which are arranged beneath a track 21, preferably formed of a segmental flat bar, secured upon the bottom of the side beam 11, of the under frame, so that the car body rests at that region upon said pair of friction rollers. The axes of said rollers should be arranged radially with relation to the axis of the pivotal support 26, upon the opposite side of the truck 3, (which corresponds with the support 16, above described in connection with the truck 2) and the segmental track 21, should be concentric with said axis. As above stated, the trucks 2, and 3, are counterparts in construction, the only difference of arrangement being that the positions of the pivotal supporting connection and traveling supports are reversed with relation to the median plane of the structure, as shown in the drawings.

The trucks 2, and 3, are connected together, at points on opposite sides of the median plane, by means of a rigid diagonal link 18, which is pivotally attached to the truck 2, at 19, and to the truck 3, at 20. This link constitutes the preferred means for limiting the extent of the swinging movements referred to, and for correlating said movements, as will now be described by reference to the diagrammatic views of Figs. III, and IV. In order to avoid complication, I have omitted from these figures most of the details of the structure, and have only indicated the general outline of the essential elements, and a conventional representation of a curved track, showing approximately the theoretical lines of contact between the rails and the wheel flanges. The car, whose under-frame is represented at 1, is in each instance, supposed to be running, in the direction of the arrow, and upon a track, which has a curved portion; in Fig. III, the curve 3, of the track 30, commences at 31. The leading portion of the flange of the wheel 8, upon the forward axle 7, engages with the inner face of its rail, at the commencement of the curve, and the rearward portion of the flange of the wheel 6, also engages with the inner face of its rail. The resistance thus occasioned tends to shift the wheels laterally and toward a position in which the axle 7, would become approximately radial to the curve. In the effort of the parts to attain this position the truck 3, is swung rearwardly upon the pivot 26. The thrust upon the link 18, occasioned by this movement, tends to swing the opposite end of the rear truck 2, rearwardly upon the pivotal connection 16, but since the wheels 5, and 6, are still upon the straight portion of the track, this effort to swing the rear truck is resisted by the lateral contact of the flanges of its wheels with the tracks, and consequently the car body itself tends to swing with relation to the rear truck, upon the pivot 16, so that the front end of the car moves toward the center of the curve. The resultant of the several movements is that all four wheels, approach as nearly as possible to positions where, considered as a group, they encounter the least general resistance. When the wheels of the rear truck also enter the curve, the change of resistance due to the contact of their flanges with the sides of the rails, occasions a correlated movement of the trucks and car-body, in the effort to assume positions of least general resistance for the whole group of wheel flanges, and when the front wheels leave the curve and reënter upon a straight track, a further correlated movement of the trucks and car-body takes place, tending toward the same general result. It will thus be seen that the combined mode of operation, when either or both pairs of wheels are running upon a curved track, tends to permit the flanges of the wheels, considered as a group, to assume positions of least general resistance with relation to the rails.

In Fig. IV, the curve 32 is represented in the reverse direction from that of Fig. III, and it will be obvious that a generally similar action occurs, the difference being that the effort of the first truck to move toward a position, in which its axle would become radial to the curve, exerts a pull upon the link 18, instead of a thrust. The correlated movements of the trucks and the car body are in a certain sense the converse of that above described, but result, as before, in an approach toward a position of least general resistance of all the wheels, considered as a group, with relation to the rails.

In Fig. VI, I have shown a modification of the traveling support, the feature of difference being that the segmental track 35, is formed with two double-inclined portions 36, and 37, respectively, so that as the truck swings in either direction from a position in which the axles are at right angles to the median plane of the car, each of the rollers 38, and 39, will be forced against the incline, and the weight of the car body will tend to move the truck toward its former position, but as the incline is slight, the increase of resistance thus occasioned will not injuriously affect the operation of the other elements.

Referring now to Figs. VII and VIII, in which a modified general arrangement is shown, it will be noted that the car body (the skeleton of whose under-frame is indicated at 40) is provided with two trucks 41, and 42, respectively, each truck having a pair of axles and four wheels. The axles of the truck 41, are indicated at 43, and 44, and the wheels thereof at 45, 46, and 47, 48, respectively, the axles of the front truck 42, being indicated at 50, and 51, and the wheels thereof at 52, 53, and 54, 55, respectively.

Referring to the truck which is at the left hand end of Figs. VII, and VIII, the pivotal supporting connection between the truck and the car body is indicated at 60, the main features being generally similar to those previously described in connection with the two-wheeled truck, and the axis of the pivotal support being at a distance laterally from the median plane of the structure, but the position of the pivot is intermediate between the two axles 43, and 44, and it is located upon the inner side of the beam 62, in this instance, as indicated in the drawings. Referring to the opposite side of the truck, the traveling support which intervenes between the car body and the truck, is similar in its general character to that first above described, but in this instance the positions of the parts are shown as reversed. Thus, the segmental tracks 63, and 64, are mounted upon the truck, and the friction rollers 66, and 67, are mounted on the under side of the car body, the axes of the said rollers being radial to the axis of the pivotal connection at 60, and the curvature of the segments 63, and 64, being concentric with the latter. The other truck 42, is a counterpart of the one just described, except for the reversal of the positions of the pivotal supporting connection and traveling support with relation to the median plane of the structure, as will be obvious from inspection of Figs. VII, and VIII. A rigid connecting link 68, is pivotally attached to the truck 41, at 69, and to the truck 42, at 70. The mode of operation of the combined parts in this form of my invention is generally similar to that previously described, a correlated movement of the two trucks and the car body, occurring from the operation of the same causes, but being modified in its details by reason of the fact that the resistance between the car flanges and the rails is developed at a greater number of points, and that the axes of swinging movements are somewhat differently located with respect to the axles themselves.

In both forms of the invention above described, as well as in any other modifications which embody the essential principles of construction, the general result of the correlated movements which are permitted and effected tends toward an equalization of the resistance encountered by all the wheel flanges, considered as a group, the effort of the parts being to approach a position of minimum general resistance.

In the foregoing specification, I have described a pivot and adjacent bearing surfaces as constituting the supporting connection between the car and the truck, and I have described the traveling support as comprising friction rollers and a track or tracks. It must be understood however, that I do not limit my invention in its broad aspect, to the use of these specific elements, it being only necessary, in so far as concerns the characteristic swinging action, that there should be supporting means for the car, of such character as to permit and control rotative movement thereof, with relation to the axle, (or vice versa), about a substantially definite vertical axis, located laterally with relation to what may be considered as the longitudinal center of the axle. Since, however, such central point is really determined by its relation to the bearing faces of the wheel flanges, I consider the most appropriate definition of its location to be that it is in the median plane of the wheels carried by such axle. While as above stated, such axis of rotative movement is preferably situated near the extremity of the axle, its location is not thus restricted, the only essential being that it should be at a substantial distance laterally from the median plane of the wheels carried by said axle.

I am aware that it is not new, in wheeled vehicles having axles pivotally connected to the vehicle body at points in the median plane of the wheels, to connect said axles by means of a diagonal link, and I therefore do not broadly claim the use of such a diagonal connection. I am also aware that it is not new to provide car trucks with traveling supports of various kinds intermediate between the car and the truck and intended to permit bodily movement of one of these elements with relation to the other, and I do not broadly claim the use of such supports.

My invention is characterized by the fact that the supporting connection which intervenes between the car and the truck is adapted to permit relative rotative movement of the parts about a substantially definite vertical axis which is located at a distance laterally from the median plane of the wheels, thus producing a wholly different general result from that which is found in other vehicle structures.

I claim:

1. The combination, with a car, an axle and a pair of wheels carried by said axle; of supporting means for the car, intervening between it and the axle, said means being adapted to permit rotative movement of the car, with relation to the axle, about a substantially definite vertical axis located at a lateral distance from the median plane of the wheels carried by said axle; and means for controlling the extent of said rotative movement.

2. The combination, with a car; of a pair of trucks each having an axle and wheels carried thereby; each of said trucks being provided with supporting means for the car, adapted to permit rotative movement thereof, with relation to the truck, about a substantially definite vertical axis located at a lateral distance from the median plane of the wheels of said truck, the said axes of rotative movement being arranged on opposite sides of said median plane; and means for correlating the respective rotative movements.

3. The combination, with a car; of a pair of trucks each having an axle and wheels; each of said trucks being provided with a supporting connection for the car, adapted to permit rotative movement thereof, with relation to the truck, about a substantially definite vertical axis located at a lateral distance from the median plane of the wheels of such truck, said axes of rotative movement being on opposite sides of said median plane; each of said trucks being also provided with means for freely supporting the car upon that side of the median plane which is opposite to the said supporting connection of such truck; and connecting means for said trucks, extending between points thereof located respectively on opposite sides of said median plane.

4. The combination, with a car, and a pair of trucks, each having an axle and wheels carried thereby; of a pivotal bearing upon each truck, intervening between said truck and the car, and adapted to permit relative rotative movement between each truck and the car about a fixed vertical axis located at a lateral distance from the median plane of the wheels of such truck, the said axes being located on opposite sides of said median plane; a traveling support intervening between each truck and the car, located upon that side of the truck which is opposite to said pivotal bearing thereof; and a rigid link pivotally attached to the respective trucks and extending between points on opposite sides of said median plane.

5. The combination, with a car and a pair of trucks, each having an axle and wheels carried thereby; of a vertical pivot and supporting bearing intervening between each truck and the car, the pivot upon one truck being arranged near the extremity of the axle of said truck, and the pivot upon the other truck being arranged near the opposite extremity of the axle thereof; traveling supports intervening between the car and the respective trucks, said supports being respectively located at that side of each truck which is opposite to the said pivotal bearing thereon; and a link pivotally attached to the respective trucks at the sides thereof which are provided with said traveling connections.

6. The combination, with a car body and a pair of trucks, each truck having a plurality of axles and pairs of wheels carried respectively by each of said axles; of supporting means intervening between each of said trucks and the car, adapted to permit rotative movements thereof with relation to the trucks, about substantially definite vertical axes located at lateral distances from the median plane of the wheels of each truck and upon opposite sides of said median plane; traveling supports intervening between each truck and the car at that side of the respective trucks which is opposite to its axis of said rotative movement; and connecting means adapted to correlate the rotative movements of the parts about said vertical axes.

In testimony whereof, I have hereunto signed my name at Philadelphia, Pennsylvania, this sixth day of February 1911.

JAMES T. HALSEY.

Witnesses:
 JAMES H. BELL,
 E. L. FULLERTON.